Figure 6:
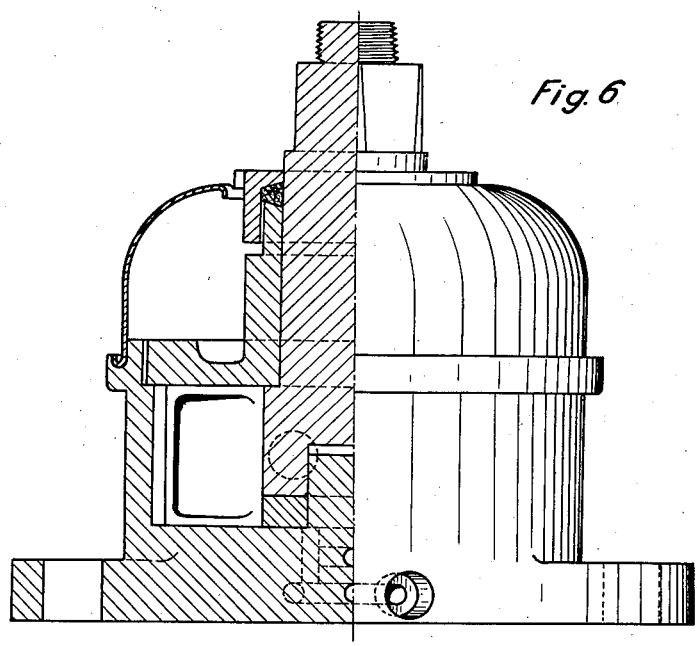

Dec. 29, 1936.  J. SPYKER  2,065,832
HYDRAULIC SHOCK ABSORBER SYSTEM
Filed Sept. 4, 1930  5 Sheets-Sheet 1
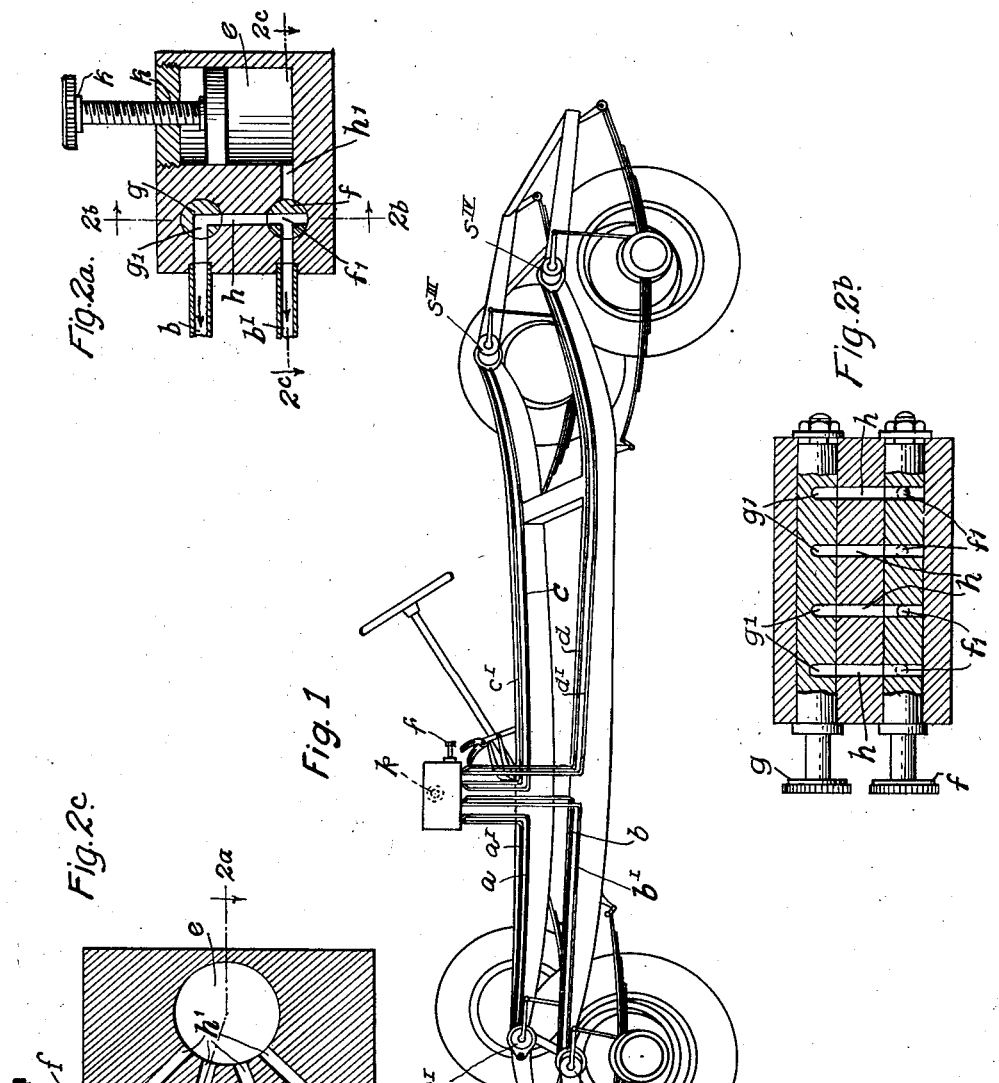

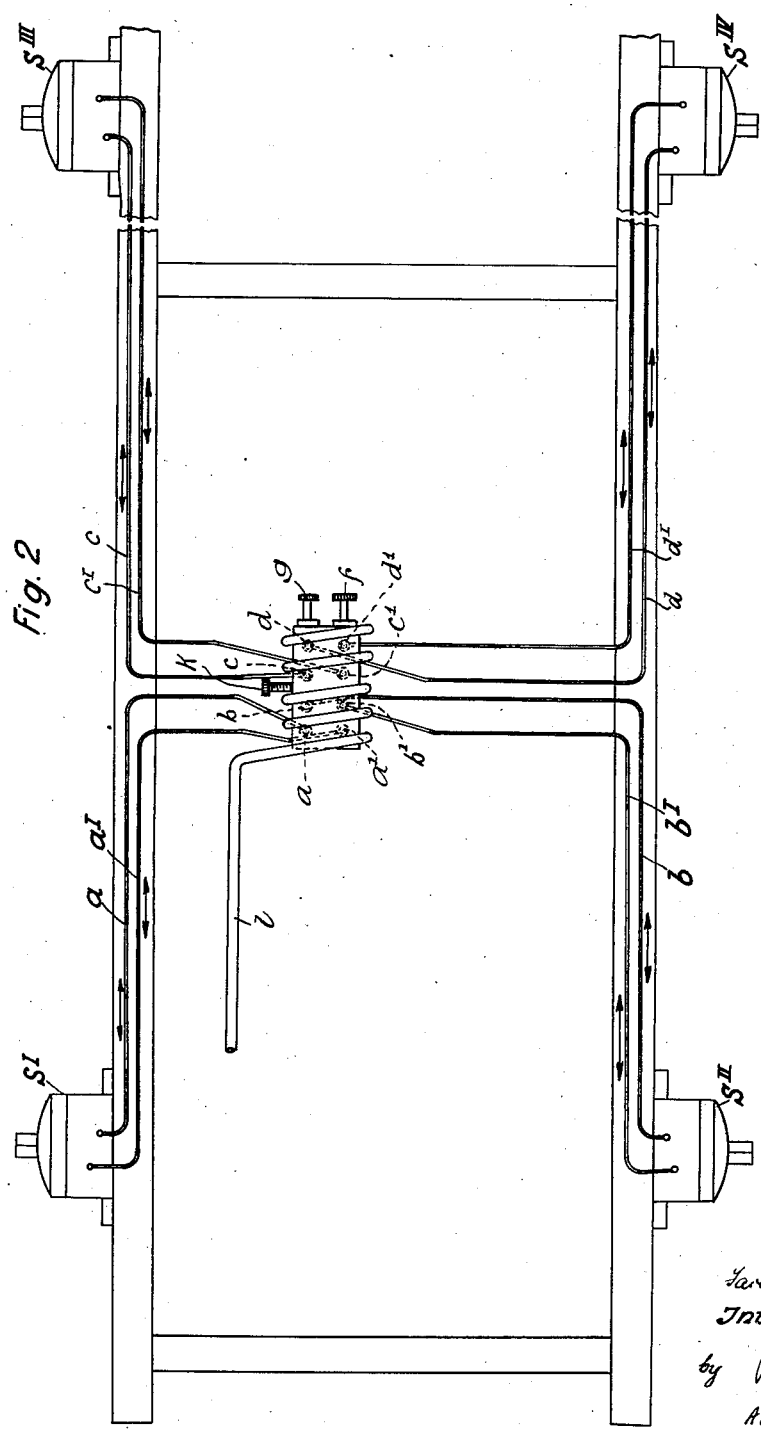

Dec. 29, 1936.        J. SPYKER        2,065,832
HYDRAULIC SHOCK ABSORBER SYSTEM
Filed Sept. 4, 1930        5 Sheets-Sheet 3
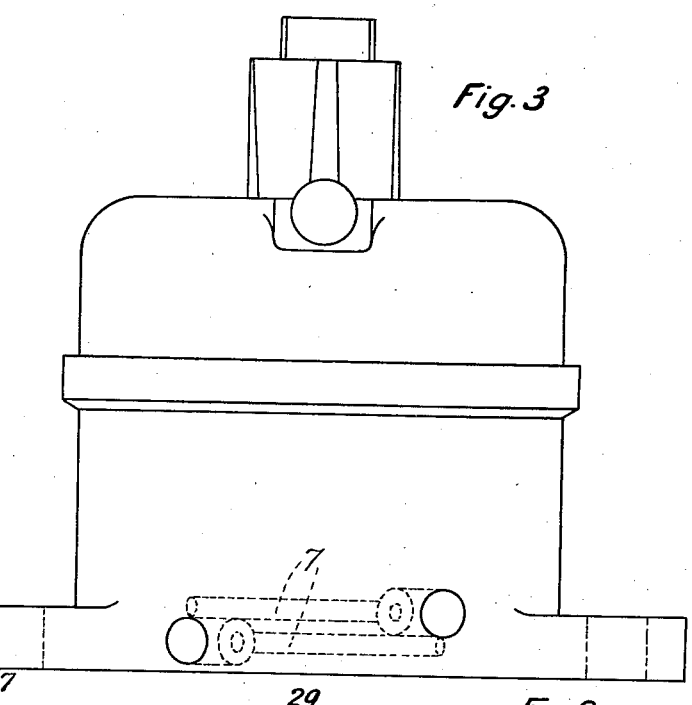
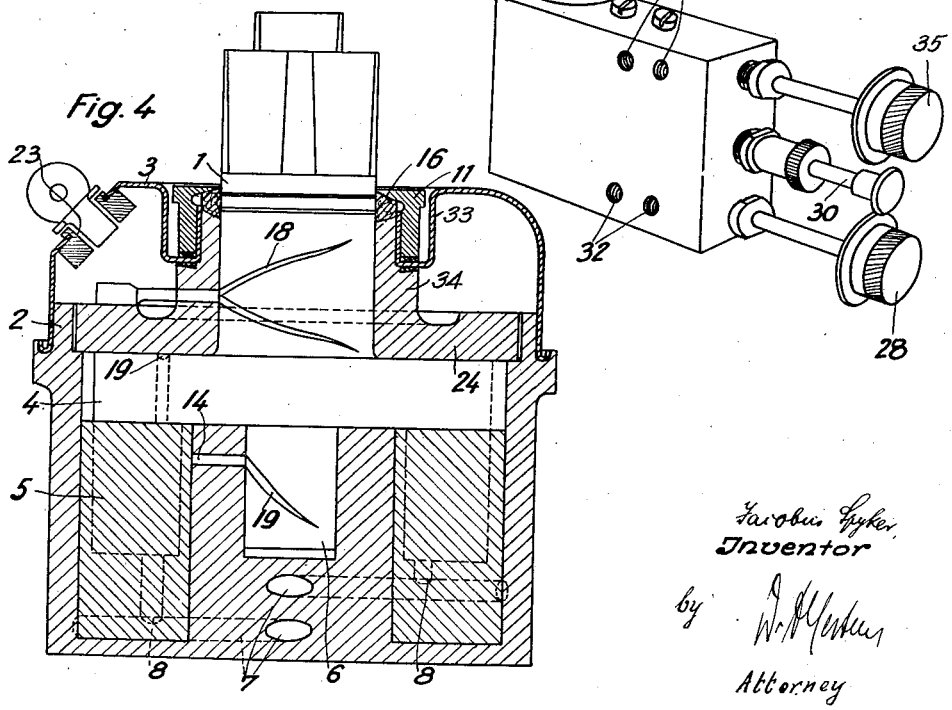

Dec. 29, 1936.   J. SPYKER   2,065,832
HYDRAULIC SHOCK ABSORBER SYSTEM
Filed Sept. 4, 1930   5 Sheets-Sheet 4

Dec. 29, 1936.  J. SPYKER  2,065,832
HYDRAULIC SHOCK ABSORBER SYSTEM
Filed Sept. 4, 1930    5 Sheets-Sheet 5
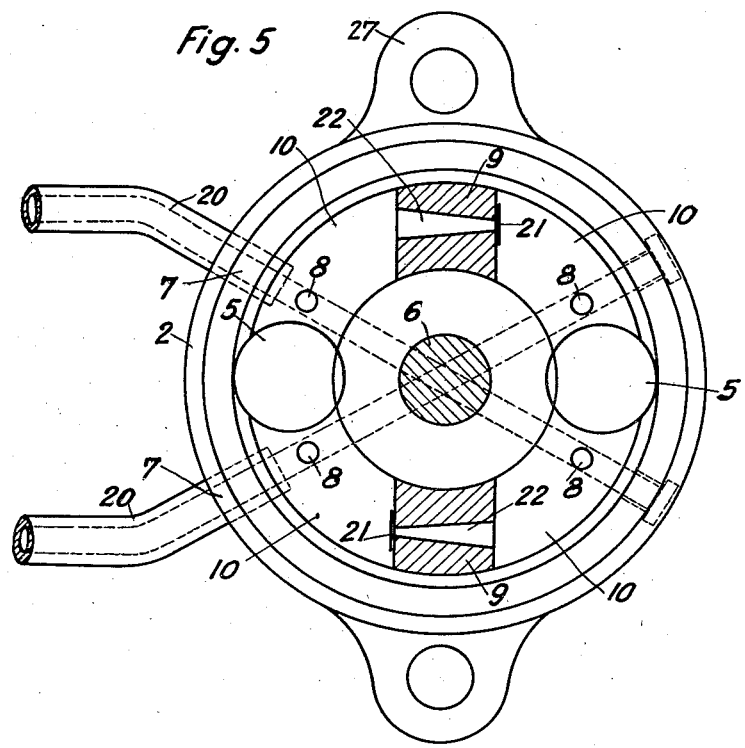
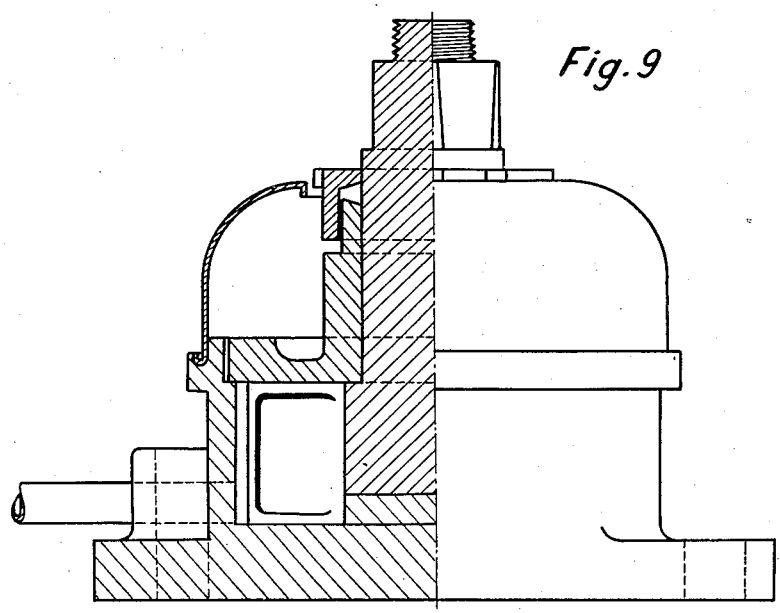

UNITED STATES PATENT OFFICE 2,065,832

HYDRAULIC SHOCK ABSORBER SYSTEM

Jacobus Spyker, Amsterdam, Netherlands; Geertruy Elisabeth Spyker, executrix of said Jacobus Spyker, deceased, assignor to Henry Havelock Logan, Chicago, Ill.

Application September 4, 1930, Serial No. 479,653
In Germany June 25, 1930

7 Claims. (Cl. 188—87)

This invention relates to hydraulic shock absorbers, especially for automobiles and consists essentially therein that a plurality of individual shock-absorbing devices are provided of which each is associated with one wheel of the vehicle in the manner of a central or "multiple unit" control system, for the purpose of uniformly controlling the operation of the several shock-absorbers.

My invention further comprises various devices associated with the shock-absorbers for the individual wheels of an automobile or other vehicle and the central control organ as well as various modes of regulating, controlling and adjusting the operation of the individual shock-absorbers by means of a common control organ. My invention comprises in addition special control instrumentalities interposed between said common control organ and the several individual shock absorbing devices forming part of the shock absorber as a whole.

Hydraulic shock-absorbers are being used at the present time to an increasing extent in connection with automobiles, said shock-absorbers being connected to each spring of the four axles of the automobile or directly to said axles.

Shock absorbers of this kind consist of a piston which may reciprocate within a cylinder or chamber filled with a liquid and upon each stroke forces said liquid to flow from a space on the one side of the piston to the space on the other side of the piston. The damping or shock absorbing action is generally effected by counteracting the flow of said liquid by means of a resistance for instance a choking device, which opposes motion of said piston and therewith motion of the parts of the automobile connected therewith. The liquid passing in this manner from one to the other side of the piston may be conveyed by means of any kind of conduit, especially by means of some longer pipe conduit, in which case it will also be possible to provide the aforementioned choking device at any desired point of this conduit. If a plurality of shock absorbers is employed such as is the case with automobiles, it will be possible to unite the conduits connected to the two sides of each piston so that there will only be a common conduit, one end of this conduit being connected to the front spaces and the other end to the rear spaces of the pistons which form part of the individual shock absorbers. Shock-absorbers as known should be properly supervised after being once adjusted, and at times re-adjusted, in accordance with the desired degree of damping effect to be exerted upon the wheels, with the condition of the road at a time travelled upon by the automobile, with the temperature prevailing at a time and so forth. Heretofore, the driver of the automobile had to take care of the supervision and adjustment of the shock-absorbers which must be individually adjusted in accordance with the aforementioned conditions, such as the degree of damping, the condition of the road, the temperature and so forth. Such adjustment of individual shock-absorbers, evidently is connected with considerable inconvenience on the part of the driver and, in addition, requires a rather long time. Adjustment of the several shock-absorbers had ordinarily to be carried out according to special rules given by the manufacturer of the car or of the shock absorbers and a proper control as regards adjustment of the shock absorbers with respect to prevailing conditions had so far been impossible. More particularly, a uniform adjustment of the several shock-absorbers could heretofore never be attained and in consequence thereof very disagreeable conditions have arisen during travel. Proper adjustment of hydraulic shock-absorbers had heretofore been rendered difficult, especially on account of the presence of air-pockets in the operating liquid. In addition, the danger of formation of air-pockets in the operating liquid increases with the number of places at which shock-absorbers have to be mounted.

My invention now is especially designed to do away with the aforementioned drawbacks which had heretofore been connected with hydraulic shock-absorbers of the known type. A main feature of my invention consists in providing a possibility of uniformly adjusting all shock-absorbers mounted on a car, preferably in such a manner that adjustment may be carried out uniformly from a central point, such as the driver's seat, according to a multiple unit control system, thus doing away with the necessity of individually adjusting each shock-absorber. According to my present invention, therefore, uniform adjustment may be effected at every individual shock-absorber from a central point.

Hydraulic shock-absorbers comprising a wing-piston or the like mounted within a cylinder divided into a plurality of chambers may be controlled and adjusted according to my invention by connecting a pressure liquid conduit not only to those chambers of said cylinder which are reduced in volume during operation but also to those chambers which are enlarged, and by connecting said conduits to the central multiple unit control apparatus for the several shock-absorbers. One of said conduits serves for discharging pressure liquid from the chambers of the cylinder, while the other conduit serves for supplying pressure liquid to said chambers, it being noted especially that the one and the other of said conduits may alternately serve as supply or as a discharge conduit in accordance with the temporary condition of the shock-absorber and in accordance with their temporary adjustment.

All discharge as well as supply conduits to be controlled by the multiple unit control system according to my present invention are united into a single discharge and supply conduit, respectively, and both of said single conduits are controlled by a central multiple unit control mechanism. For this purpose said single conduits are connected with each other by means of a valve or cock permitting adjustment of the passage of liquid through the one and the other of said single discharge and supply conduits. By adjusting this valve or cock the driver will be enabled to fully and uniformly control and adjust the operation of the several shock-absorbers, this control and adjustment being accomplished by merely adjusting said valve or cock to cause a greater or smaller quantity of liquid to pass from one of said conduits into the other. Apparently, adjusting the shock-absorbers by varying the amount of liquid passing from one into the other common discharge and supply conduit will have the effect of varying the stroke of the aforementioned wing-piston which ordinarily forms part of hydraulic shock-absorbers.

In order to provide a compensation for losses of liquid which may arise during operation or control of the shock-absorbers the valve or cock interposed between the common discharge and supply conduit according to my invention is constructed in the form of a three-way valve, two passages of said valve leading to the supply and discharge conduit while the third passage leads to a reserve container for pressure liquid. In this manner the pressure liquid used for controlling and adjusting the several shock-absorbers may be properly supplemented by means of a supplementary central liquid supply device which is common to all shock-absorbers. In like manner the pressure of the operating and controlling liquid for the shock-absorbers may be increased in order to prevent the aforementioned formation of air-pockets within the pressure liquid.

In contra-distinction to shock-absorbers having wing-pistons of the heretofore known construction in which the liquid conduits between the several chambers had to pass through said wing-pistons, according to my invention these conduits are connected to a fixed member of the shock-absorber, that is to a member which remains in a position of rest in every condition of the shock-absorber. This is a further novel feature of my invention. More particularly, the aforementioned fixed member to which the pressure liquid conduits are connected may, for instance, form the bottom of the casings which surround the shock-absorbers and may be suitably fixed to the frame or body of the automobile.

The novel principle of my invention viz: to control and adjust the several shock absorbers according to the principle of a multiple unit control system by means of a pressure liquid from a central point will render it possible to uniformly and properly adjust and control all shocks of a car from a central point, such as for instance, from the driver's seat in accordance with the desired degree of resiliency of the car, in accordance with given conditions, such as the condition of the road, the conditions of temperature and the like.

In addition to the aforementioned conditions which may affect the operation of the shock-absorbers in general and the shock absorbing effect in particular and therewith the resiliency of the car as a whole, the temperature of the pressure liquid which serves for actuating, controlling and adjusting the shock-absorbers is of essential importance. In order to utilize the effect of the different temperatures of the pressure liquid upon the operation, control or adjustment of the shock-absorbers, according to my invention there are further provided heating and cooling devices at the point of central control in connection with the liquid discharge and supply conduits. Preferably such heating and cooling devices may consist of coiled tubes laid around the respective conduits, said coiled tubes being either connected with the cooling water conduit for the motor of the car, or also with the gas discharge conduit thereof, by means of suitable valves or cocks permitting to pass according to requirements, different amounts of heating or cooling liquid to said conduits.

My invention will be more fully understood by reference to the accompanying drawings in which I have represented a hydraulic shock-absorber constructed to be controlled according to the principles of my present invention in the manner of a multiple unit control system.

Figure 7:
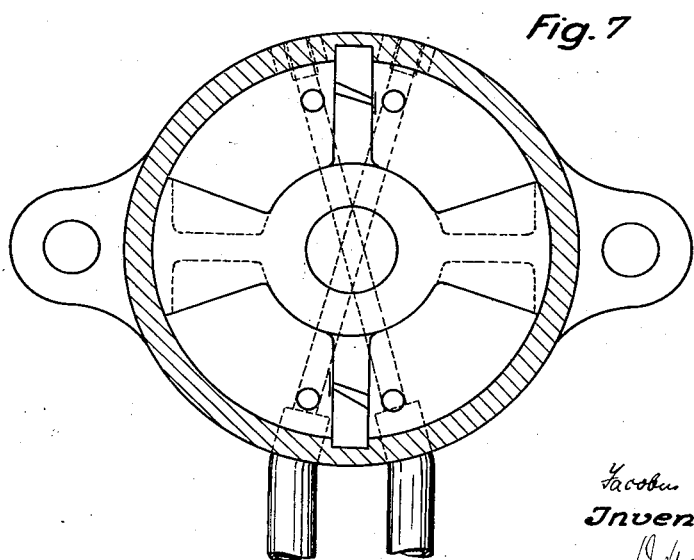

In the drawings Fig. 1 is a perspective side-view showing the under frame of an automobile together with the springs and wheels, the novel hydraulic shock absorber being shown diagrammatically, said shock absorber including an individual shock-absorber for each wheel, a common central multiple unit control organ preferably mounted near the driver's seat and pressure liquid circuits intermediate said control organ and each of the shock absorbers; Fig. 2 a diagrammatic top-view, drawn in an enlarged scale, of the underframe of a car, showing the several shock-absorbers, the central multiple unit control organ which is common to all shock-absorbers, as well as the pressure liquid conduits, intermediate said control organ and each of said shock-absorbers; Fig. 2a is a cross sectional view on the line 2a, 2a of Fig. 2c through the central control unit, showing a preferred relation of valves f and g and container e; Fig. 2b is a sectional view of the central control unit, taken on the line 2b of Fig. 2a; Fig. 2c is a sectional view through the central control unit, taken on the line 2c of Fig. 2a; Fig. 3 is a top view of one of the individual shock absorbers which form part of the multiple unit control system according to my present invention; Fig. 4 a vertical section taken centrally through Fig. 3; in the plane of the drawing; Fig. 5 a side-view, partly in section, of a casing of one of the individual shock-absorbers, together with the pressure liquid supply and discharge conduits adjoining said casing; Fig. 6 another top-view, partly in section, of a modified shock-absorber used in connection with my present invention; Fig. 7 a section taken along a vertical central plane through the casing of the shock-absorber shown in Fig. 6; Fig. 8 a perspective view showing the general arrangement of the central control organ in connection with a separate multiple unit control system for the shock-absorbers for the front and rear wheels of an automobile permitting adjustment of the individual shock-absorbers on the front wheels and the individual shock-absorbers on the rear wheel independently from each other; and Fig. 9 a top view, partly in horizontal section, of a modified type of shock-absorber which may be used in connection with my present invention.

My invention is of course not limited in its application to the type of shock-absorbers shown herein especially in Figs. 3, 4, 5, 6, 7, and 9, it being possible to successfully use any of the existing types of shock-absorbers, especially shock-absorbers of the type shown in Figs. 6 and 7, in connection with the multiple unit control system according to my present invention.

Referring to the drawings, and particularly to Figs. 1, 2, 2a, 2b, and 2c, the pipes $a$, $a'$, $b$, $b'$, $c$, $c'$, and $d$, $d'$ are connected to the central control organ which is preferably located adjacent the driver's seat. Each pair of pipes $a$ and $a'$, $b$ and $b'$, $c$ and $c'$, and $d$ and $d'$ are connected by independent ducts $h$. A multiple 3-way valve $f$ (Figs. 2a, 2b, and 2c) extends through the ducts $h$. The valve $f$ controls communication between the pipes $a$ and $a'$, $b$ and $b'$, $c$ and $c'$, and $d$ and $d'$, and also serves to put these pipes into communication with the liquid container $e$ through ducts $h'$. A multiple valve $g$ also extends through the ducts $h$ and it will be understood that the resistance of all the shock absorbers can be controlled by this valve $g$ while maintaining each shock absorber separate from the others.

The pipe $i$ (Fig. 2) serves for cooling or for heating the service liquid as may be desired.

It will be understood that the central control unit provides means whereby an adjustable throttle condition is established between the conduits $a$ and $a'$, between the conduits $b$ and $b'$, between the conduits $c$ and $c'$ and between the conduits $d$ and $d'$ respectively. Since this regulation is effected simultaneously by the valve $g$, it is uniform for all the shock absorbers. It will also be understood that the valve $f$ enables all the shock absorbers to be put into direct communication with the chamber $e$ and that by means of the screw $k$ the supply of hydraulic fluid to the absorbers is replenished at will.

In Figs. 3 to 5 the shaft $l$ of the wing piston serves for transmitting the motions and shocks exerted by the wheel and axles to the shock-absorber, said shaft carrying the plate 4 on which the moving wing-pistons 9 are mounted, said wing-pistons together with the partitions 5 forming pressure liquid chambers 10 within the cylindrical casing 2. Plate 4 is mounted on a pivot shaft 6 which operates in a bearing in the center of the casing 2. The wing pistons 9 move within the annular path provided between said bearing and the wall of the casing 2. The casing is closed by a plate 24 which is threaded into the open mouth of the casing 2. The plate 24 carries a central bearing 34 for the shaft 1. A lubricant container 3 is forced on to the casing 2. This container is provided with a central opening, and the material around this opening is spun inwardly and outwardly into double cylindrical form as shown at 33. The base of the double cylindrical form 33 rests on a shoulder on the bearing 34 against which it is pressed by a packing gland 11. The gland 11 compresses packing 16 against the shaft 1. The interior of the container 3 is rendered accessible through an aperture 23 therein. The aperture 23 may be closed up during operation of the shock-absorber.

Non-return or check valves 21 are provided on said wing-pistons 9, said valves 21 serving for closing up the channels 22 at one end thereof, said channels passing through said piston-wings. The oil channel 14 and oil grooves 18 and 19 serve to provide lubrication for all parts of the shock-absorber which are subject to friction.

Connecting channels 7 with branches 8 serve for conveying the pressure liquid during operation of the shock-absorber from one into the other cylindrical chambers and vice versa. The path of motion as well as the amount of the liquid passing through the pressure liquid channels is of special importance in connection with proper operation of the shock-absorbers. The shock-absorbers which I use in connection with the hydraulic shock absorber system according to my present invention are constructed to permit connection of the fixed member of the shock-absorber with the pressure liquid conduit, the fixed member forming the bottom of the casing of the shock-absorber. This fixed member or bottom of the shock-absorber may be fastened to the underframe of the automobile by means of the lugs and eyes 27 provided on said fixed member or bottom. The conduits 20 form extensions of the channel 7 and lead to the central control organ in the above described manner. Supply and discharge of pressure liquid to and from the several chambers 10 may be uniformly regulated and adjusted from a central point preferably by said central control organ which is mounted near the driver's seat. By using a pressure liquid container at the central control organs, provision of special pressure liquid containers in connection with each individual shock-absorber, such as had heretofore been usual, will be dispensed with. As shown in Fig. 9 the oil supply conduits which lead to the several shock-absorbers are not carried through the bottom of the casing of the shock-absorber but introduced thereinto at some point laterally of said casing.

In certain cases it may be preferable to adjust or regulate the shock-absorbers which are connected to the rear wheels of the automobile in a manner different from that in which the front wheels are regulated or adjusted. For this purpose evidently, two systems of pressure liquid conduits may be used, one system for the shock-absorbers at the front wheels and the other system for the shock-absorbers at the rear wheels, both of said systems of pressure liquid conduits leading to the central control organ and each of said conduits consisting of a supply and discharge conduit. Passage of pressure liquid from the supply conduit into the appertaining discharge or suction conduit may in this present case be effected by two separate control organs which, however, form a unitary device as regards their location.

In Fig. 8 is shown a central control organ which is used for the purpose of controlling a group of shock-absorbers, mounted on the front wheels of the car independently from another group of individual shock-absorbers. A cock or valve operated by the knob 35 effects the throttling of conduits connected to the openings 31, which conduits are connected to opposite sides of the shock-absorbers on the front wheels. A similar valve or cock operated by knob 28 effects the throttling of conduits connected to openings 32, which conduits are connected to opposite sides of the shock-absorbers on the rear wheels. The central control organ as shown in Fig. 8 is further provided with a container 29 for reserve liquid permitting to supplement losses of liquid which may have taken place in the supply conduit or conduits, said liquid container being associated with a pump which may be operated by the piston 30 as indicated in Fig. 8.

As diagrammatically illustrated in Fig. 2, I may wind a coil of pipe 1 around the central control organ for the purpose of supplying heat thereto. The coil 1 may be supplied with fluid heated by the engine when in operation. This expedient prevents the viscosity of the fluid passing through the throttled openings from becoming excessively high in cold weather, with consequent hard riding qualities.

I claim:

1. A hydraulic shock absorber system for automobiles including a shock absorber associated with the spring of a wheel, a control organ located remotely with respect to said shock absorber, a liquid container associated with said control organ, a pair of conduits communicating with opposed compartments of said absorber and a three-way valve at said control organ providing controlled communication between said conduits and said liquid container.

2. A hydraulic shock absorber system for automobiles including a plurality of individual shock absorbing devices and a multiple unit control organ common to said devices and adapted commonly to control the operation of the latter from a central point, and in which the individual shock absorbing devices comprise each a wing-piston adapted to operate within a cylinder subdividing it into chambers, and each shock absorbing device having a pressure liquid conduit associated with one chamber and a second pressure liquid conduit associated with another chamber, said two pressure liquid conduits of each shock absorbing device leading to said multiple-unit control organ, said control organ comprising a valve for uniformly controlling the operation of each of said individual shock absorbing devices while separating the liquid of each shock absorber from the others during operation.

3. A hydraulic shock absorber system for automobiles including a plurality of individual shock absorbing devices and a multiple control organ common to said devices and adapted commonly to control the operation of the latter from a central point and in which the individual shock absorbing devices comprise each a wing-piston adapted to operate within a cylinder subdividing it into chambers, and having two pressure liquid conduits, one of said conduits being associated with one chamber, the other of said conduits being associated with another chamber, said central control organ comprising a multiple valve for controlling communication between the two conduits of each shock absorbing device while preventing communication between said devices during operation.

4. A hydraulic shock absorber system for automobiles including a plurality of individual shock-absorbing devices and a multiple-unit control organ common to said devices and adapted commonly to control the operation of the latter from a central point, and in which the individual shock absorbing devices comprise each a wing-piston adapted to operate within a cylinder subdividing it into chambers, and each having two pressure liquid conduits, one of said conduits leading to one chamber, the other of said conduits leading to another chamber, said two pressure liquid conduits being connected to said multiple-unit control organ, said control organ comprising a liquid container and a multiple three-way valve adapted to connect each shock absorbing device to said container and to control communication between the conduits of each shock absorbing device while preventing communication between said devices during operation.

5. A hydraulic shock absorber system for automobiles including a plurality of individual shock absorbing devices and a multiple control organ common to said devices and adapted commonly to control the operation of the latter from a central point and in which the individual shock absorbing devices comprise each a wing-piston adapted to operate within a cylinder subdividing it into chambers, and having two pressure liquid conduits, one of said conduits being associated with one chamber, the other of said conduits being associated with another chamber, said two pressure liquid conduits leading to said multiple-unit control organ, permitting to uniformly control the operation of said individual shock absorbing devices from a central point, and temperature regulative means associated with said pressure liquid conduits adjacent said multiple-unit control organ.

6. A hydraulic shock absorber system for automobiles including a plurality of individual shock absorbing devices and a multiple control organ common to said devices and adapted commonly to control the operation of the latter from a central point and in which the individual shock absorbing devices comprise each a wing-piston adapted to operate within a cylinder subdividing it into chambers, and having a pressure liquid conduit leading to one chamber, and a second pressure liquid conduit leading to another chamber, said two pressure liquid conduits leading further to said multiple-unit control organ, permitting to uniformly control the operation of said individual shock absorber devices from a central point, and temperature control means for said pressure liquid conduits located adjacent said multiple-unit control organ.

7. A hydraulic shock absorber system for automobiles including shock absorbers associated with the front wheels and shock absorbers associated with the rear wheels, a pair of conduits connected to opposite compartments of the front shock absorbers, a pair of conduits connected to opposite compartments of the rear shock absorbers, and a pair of regulable throttle mechanisms located remotely with respect to the shock absorbers, each said mechanism connecting the conduits of each pair through a controlled opening.

JACOBUS SPYKER.